Dec. 11, 1928.
C. B. PRITCHARD
1,694,689
PROCESS OF MAKING METALLIC RIMS FOR BULL WHEELS
Filed May 13, 1925    4 Sheets-Sheet 1
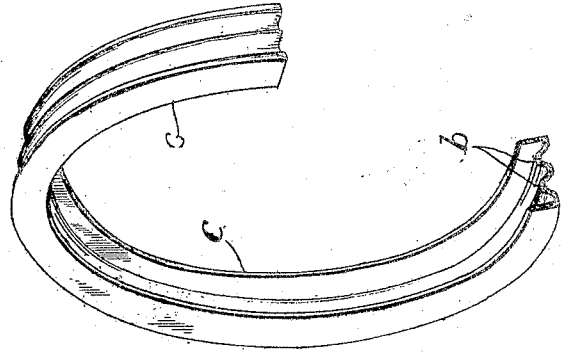
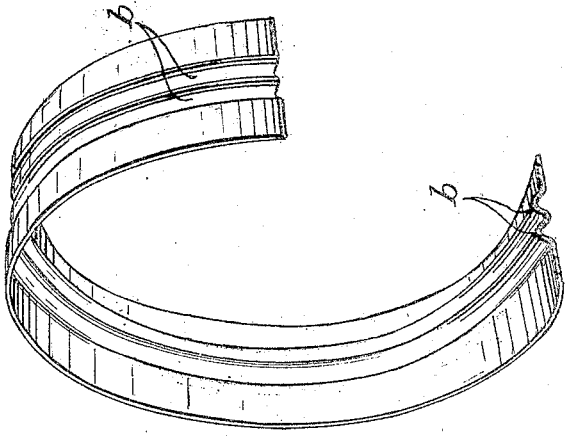
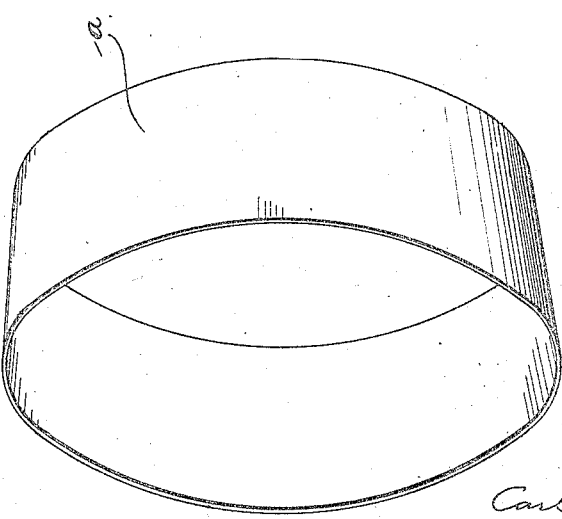

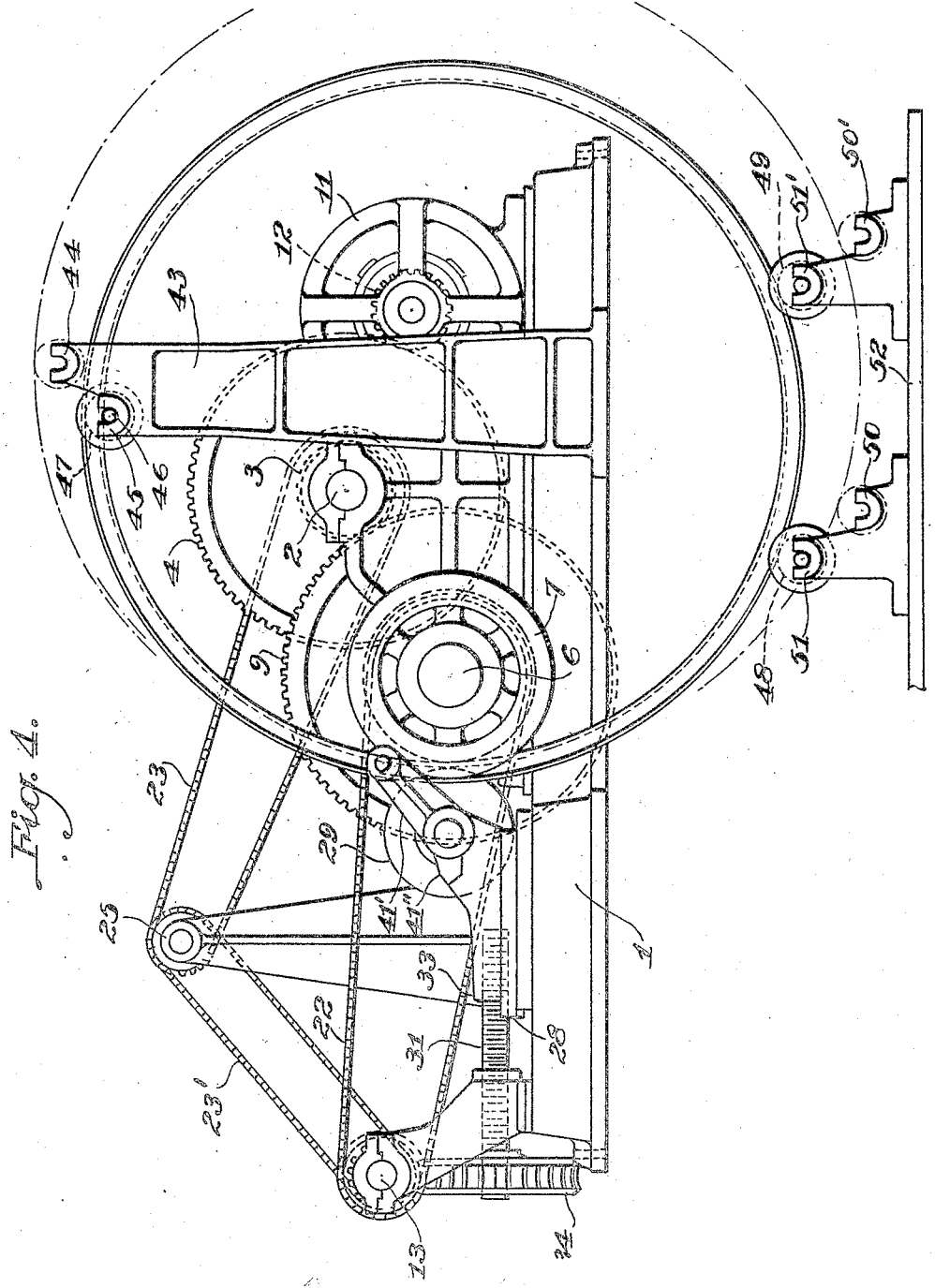

Dec. 11, 1928.
C. B. PRITCHARD
1,694,689
PROCESS OF MAKING METALLIC RIMS FOR BULL WHEELS
Filed May 13, 1925     4 Sheets-Sheet 3
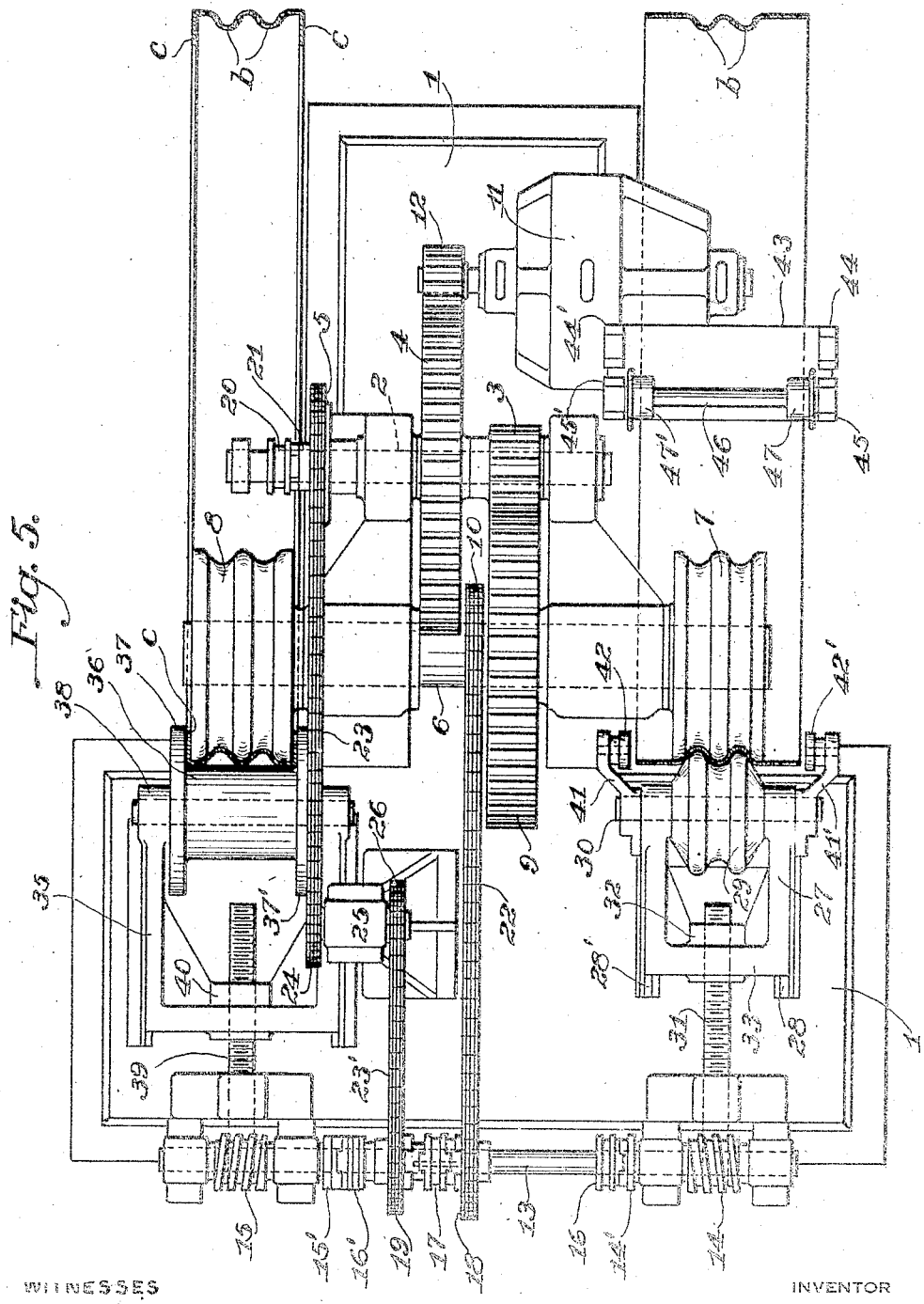

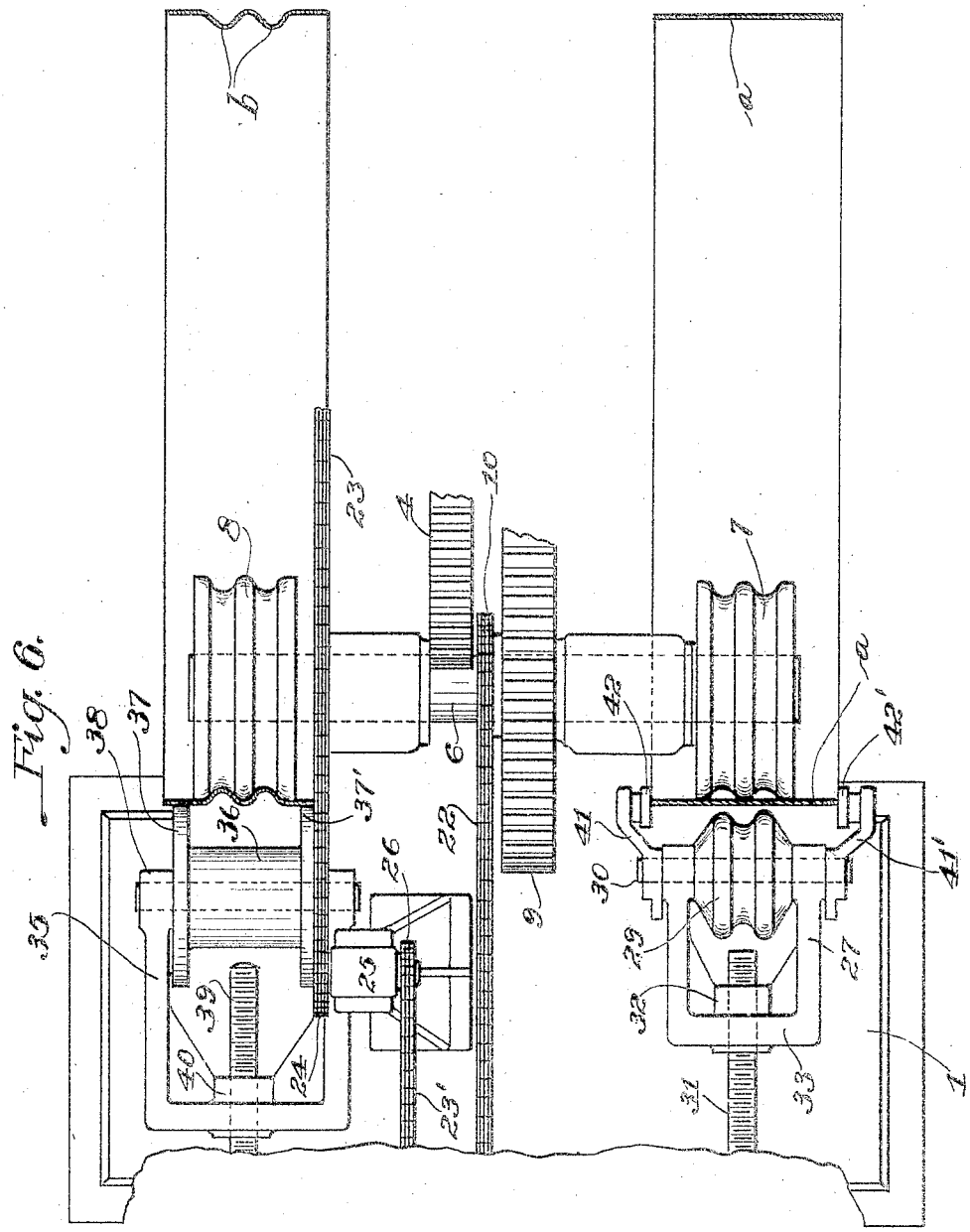

Patented Dec. 11, 1928.

1,694,689

UNITED STATES PATENT OFFICE.

CARL B. PRITCHARD, OF SCOTTDALE, PENNSYLVANIA.

PROCESS OF MAKING METALLIC RIMS FOR BULL WHEELS.

Application filed May 13, 1925. Serial No. 29,913.

This invention relates to a method of producing bull wheels, and particularly to a process for forming metallic rims therefor.

It is an object of the invention to provide a process which is simple, easy to perform, which can be carried out by a sturdy efficient apparatus not liable to get out of order, and by which metallic one-piece rims for bull wheels having a corrugated body and radially inturned integral marginal flanges may be readily and rapidly fabricated.

It is a special object to provide a process by which rims of the character referred to may be produced by the use of suitable apparatus in a manner assuring a uniform and symmetrical product, by which rims of large diameters may be fabricated without danger of distorting their circular shape to an objectionable or noticeable degree, and which lends itself to the requirements of modern commercial methods of production.

These and other objects of the invention will more fully appear when taken in conjunction with the following description and the appended claims.

In the accompanying drawings forming a part of the application, Figs. 1 to 3, inclusive, are fragmentary perspective views showing the transition of the continuous annular blank through the several steps of the process during the formation of the rim; Fig. 4 a side elevation of a machine for carrying out the improved process; Fig. 5 a plan view of the machine illustrated in Fig. 4; and Fig. 6 a fragmentary plan view of a portion of the machine, illustrating the relative positions of the driving and forming rolls just prior to the action of the forming rolls for either corrugating or flanging the blank.

Referring to the drawings, particularly Figs. 1 to 3, $a$ designates the continuous annular blank which is successively corrugated and flanged for the purpose of producing a single-piece metallic rim for use in connection with bull wheels of well drilling apparatus. The blank is initially of cylindrical shape, such as shown in Fig. 1 of the drawings, and may be produced in any suitable way provided the gage of the metal is sufficiently heavy to assure the production of a rim having the necessary characteristics for its intended purpose. A cylindrical blank $a$ is first suitably operated upon to produce at the central region of its body, and spaced from the opposite ends of the blank, corrugations such as indicated at $b$, Fig. 2 illustrating the blank after it has been corrugated in this manner. The corrugated blank is then subjected to a flanging operation in which the opposite ends of the corrugated blank are turned radially inwards at its opposite marginal edges extending beyond its central previously corrugated portion, said marginal edges being simultaneously deflected or displaced inwardly to produce inturned flanges $c$. The finished rim formed by producing the inturned flanges $c$ in this manner is clearly shown in Fig. 3 of the drawings.

In carrying out the several steps, broadly stated above, both the corrugation of the body and the production of the flanges at the opposite ends of the rim are accomplished during the turning movement or rotation of the blank being operated upon about its axis accompanied by the displacement or deflection of the metal at successive points circumferentially of the blank, while securely positioning the blank against bodily shifting movement, particularly in an axial direction, and while maintaining the circular shape of the blank until completely corrugated for the purpose of assuring a substantially perfectly shaped circular rim as a finished product, and enabling such rims to be readily produced from blanks having exceedingly great diameters which under their own weight, if supported at but one region of their circumferential extent, would ordinarily tend to assume a pronounced oval or elliptical form.

The process or method forming the subject of the present invention, can possibly be most readily understood by describing it in connection with an apparatus for performing it, and for this reason one construction of apparatus for carrying out the improved process has been illustrated in Figs. 4 to 6, inclusive, of the drawings. The machine illustrated corresponds to that shown and described in my Patent No. 1,507,424, dated September 2, 1924. Consequently many of the structural details of the machine need not be set forth at length herein.

Briefly described, the machine illustrated in the drawings, comprises a base plate 1, which is of relative T-shape, as clearly shown in Fig. 5, being equipped with a convenient number of upstanding bearing standards in which the several shafts are supported and journalled. Located at the forward portion of the base plate is a transversely extending shaft 2 having keyed thereon a spur pinion 3, and a spur gear 4, as well as a loosely journalled sprocket gear 5 adjacent one of its ends. A driving roll-carrying shaft 6 is suitably journalled in appropriate bearings slightly to the rear of the transverse shaft 2, and has fixed thereto the corrugating driving roll 7 and the flanging driving roll 8, at its opposite ends, the said driving rolls projecting beyond the base plate 1. Keyed to the shaft 6 intermediate its ends are a spur gear 9 and a sprocket gear 10, the gear 9 meshing with the pinion 3 carried by the transverse shaft 2.

For the purpose of driving both the shafts 2 and 6, a high-powered electric motor 11 is mounted upon the bed plate of the machine adjacent its forward end, and the armature shaft of the motor is equipped with a spur pinion 12 meshing with the gear 4, whereby power may be transmitted from the motor through the reducing gear train comprising the gears 12, 4, 3 and 9, for the purpose of rotating the driving rolls 7 and 8 at an appropriate speed.

A cross shaft 13 is suitably journalled at the rear of the base plate, having loosely mounted thereon the worms 14 and 15, which have integrally connected therewith the clutch collars 14' and 15', respectively. Co-operating with the clutch collar 14' is a clutch element 16 splined to the shaft, while a similar clutch element 16' cooperates with the clutch collar 15'. Splined upon the shaft 13, at a point intermediate its ends is a double faced clutch element 17 which is adapted to selectively engage with clutch elements provided upon the sprocket gears 18 and 19, both of which are loosely journalled upon the shaft. The transversely extending shaft 2 is also provided with a clutch collar 20 splined thereon which is adapted to engage with a clutch element 21 forming a part of the sprocket gear 5. Any appropriate means whatever may be provided for shifting the several splined clutch elements described.

For the purpose of driving the sprocket gears 18 and 19, and thus enabling the shaft 13 to be rotated in either direction as may be desired, which can obviously be accomplished by the shifting of the clutch 17, selectively into engagement with the clutch faces on the sprocket gears 18 and 19, a sprocket chain 22 operatively connects sprocket gears 10 and 18, and a pair of sprocket chains 23, 23' operatively connect the sprocket gears 5 and 19. The chain 23 is trained around the sprocket gear 5 and a sprocket gear 24 connected to one extremity of a short shaft journalled in the upper end of standard 25, the opposite extremity of the said shaft carrying a sprocket gear 26 over which is trained the sprocket chain 23' riding over the gear 19.

Rotatably journalled in a roll carrier 27 mounted for bodily sliding movement in a pair of guiding members 28, 28', is a corrugating forming roll 29, the shaft on which it is loosely journalled being indicated at 30. The roll 29 is adapted to be moved towards and away from the driving roll 7 by means of a feed screw 31 which is threadedly received in an internally threaded boxing 32 forming a part of a cross web 33 of the roll carrier 27. The rear end of the feed screw 31 has fixed thereto a worm wheel 34 meshing with the worm 14 on the cross shaft 13.

A roll carrier 35, similar to that just described except that it is of somewhat larger dimensions, is also mounted for bodily sliding movement upon the base plate in like fashion, and carries a spool-shaped flange forming roll 36, having the end flanges 37, 37', loosely journalled upon a shaft 38. The roll 36 is adapted to be bodily moved towards and away from the driving roll 8 by means of a feed screw 39 threadedly engaging a boxing 40 on a cross web of the roll carrier 35, and having fixed to its rear end a worm wheel meshing with the worm 15.

Rockably mounted upon the opposite ends of the shaft 30 is a pair of arms 41, 41' carrying the respective guide rollers 42, 42' spaced at the opposite sides of the pass formed between the rolls 7 and 29, and at a distance apart corresponding substantially to the width of the annular blank a shown in Fig. 1. These arms may be freely swung about the shaft 30 but are limited in their movement towards the roll 7 by means of limiting stops or abutments such as indicated at 41".

The body of the roll 7 is provided with a series of alternately arranged grooves and ribs of the general nature indicated in the drawings, and the forming roll 29 is similarly shaped, the rolls 7 and 29 being complementary to each other whereby the bringing of the rolls into close proximity with a blank such as shown in Fig. 1 located therebetween will result in displacing or shaping the metal of the body of the blank to form a corrugated surface.

The roll 8 corresponds in shape to the roll 7, so that the corrugated portion of the blank, produced by coaction between the rolls 7 and 29, will enable the previously corrugated portion of the blank to seat firmly against the roll 8 with its opposite marginal edges projecting therebeyond without danger of bodily axial movement of the blank upon the flanging driving roll. The flanges 37 and 37' at the ends of the flange-forming roll 36 are identical in size, and are spaced apart sufficiently to straddle the roll 8 and to permit the metal of the blank at its marginal edges to lie between the said flanges and the end faces of the driving roll when forced to assume its ultimate form illustrated in Fig. 3 of the drawings.

Suitably supported at the forward part of the bed plate is an upstanding standard 43 equipped at its upper end with pairs of spaced apart coaxially arranged shaft end rests 44, 44' and 45, 45', which are adapted to receive the ends of a shaft 46 carrying the flanged rollers 47, 47', which rollers serve as a support for the blank during rotation while being acted upon by the rolls 7 and 29. There are also provided similar supporting shafts 48 and 49 for supporting the blank at spaced apart points at the lower portion thereof. These shafts are adapted to be supported in similarly arranged shaft end rests such as indicated at 50, 50', 51, 51', preferably adjustably mounted upon a suitable base plate 52 positioned at an appropriate level below the base plate 1 of the machine. It is to be understood, that the several pairs of shaft end rests described, and as illustrated in the drawings, have been provided for the purpose of accommodating blanks of varying diameters. With blanks of larger diameters, the shaft 46 will be placed upon the upper shaft end rest 44, and the shafts 48 and 49 upon the lower rests 50 and 50', while with blanks of smaller diameter, the shaft 46 will be placed upon the shaft end rests 45, 45' and the remaining shafts upon the rests 51, 51'. The methods of supporting blanks of larger and smaller diameters are depicted by the dotted and full lines, respectively, in Fig. 4. When properly arranged, however, the supports afforded by the several shafts, being disposed at separate points circumferentially of the blank, will cooperate with the additional support afforded by the gripping action of the rolls 7 and 29 to maintain the blank in a substantially true circular form during the entire operation upon the blank by means of the corrugating driving and forming rolls.

When using heavy gage metal, such as must be done in order to produce a satisfactory finished rim of large diameter, the forming rolls 29 and 36 must be slowly moved from their inactive positions through their progressive stages during their operation upon the blank, and the driving connections provided between the motor 11 and the sprocket gear 18 for accomplishing rotation of the shaft 13 in the proper direction to feed the forming rolls towards the driving rolls, are designed with this in view. On the other hand, the forming rolls may be retracted or withdrawn speedily after the necessary displacement of the metal has been accomplished, and for this reason the connection between the gears 5, 24, 26 and 19 has been arranged to permit rotation of the shaft 13 in the opposite direction for withdrawing the forming rolls at an increased rate.

In carrying out the process constituting the present invention, with a machine such as described above, the forming rolls 29 and 36 are first brought to their retracted or inoperative positions, such as shown in Fig. 6 of the drawings. A continuous annular or cylindrical metallic blank a, such as shown in Fig. 1, is then positioned so as to be supported by means of the shafts 46, 48 and 49, in the manner hereinbefore set forth, and with the body of the blank interposed between the driving roll 7 and the corrugating forming roll 29. The width of the blank corresponds substantially to the distance between the guiding rollers 42, 42', which consequently hold the blank against bodily axial displacement while the coaction of the several supporting shafts and the rigid backing afforded by the driving roll for the blank prevent its bodily movement longitudinally of the machine. It is also particularly noted that the disposition of the several supports for the blank at spaced points circumferentially thereof is such that the blank is maintained in a substantially true circular shape.

With the cylindrical blank thus positioned, and the driving motor 11 set in operation, the proper clutch elements are shifted to actuate the feeding screw 31 to cause the corrugating forming roll 29 to gradually approach the driving roll 7. Such movement of the roll 29 displaces the metal at the central region of the body of the blank forcing it under pressure to assume a corrugated form corresponding in shape to the pass provided between the rolls 7 and 29. It will be understood that the particular contour of the corrugations will vary in accordance with the use to which the finished product is intended to be put. The frictional contact between the inner periphery of the blank and the driving roll 7 causes the blank to be rotated about its axis on its supports during the approach of the forming roll 29 towards its ultimate position in proximity to the driving roll as illustrated in Fig. 5. The metal of the body is therefore displaced throughout successive points circumferentially of the blank until it is finally brought to the relative positions shown by Fig. 2 of the drawings. When the forming roll 29 is first brought into contact with the outer periphery of the blank, the guiding rollers 42, 42' positively prevent any axial displacement of the blank. As soon as the body of the blank has been displaced slightly in the further movement of the forming roll towards the driving roll, the coaction between the ribs and grooves of the pair of rolls with the partially formed corrugations in the blank preclude any subsequent axial displacement during the continued displacement of the metal in the subsequent corrugating action.

After a blank has been treated in this manner, to produce the corrugations at its central region, and spaced from the ends of the blank, the roll 29 is withdrawn and the corrugated blank transferred to the opposite side of the machine for further treatment by the rolls 8 and 36. The corrugated blank is then placed between the driving roll 8 and the flange-forming roll 36 in the manner indicated in Fig. 6 of the drawings. With the blank thus positioned, the flanges 37, 37' of the forming roll are adapted to lie in alignment with the marginal edges of the blank located beyond its corrugated central region, and the corrugations of the blank cooperate with the corrugated periphery of the driving roll 8 in a fashion to lock it against axial movement. Having taken care to properly adjust the parts during the previous corrugating operation so as to assure the formation of the corrugated region of the blank midway between its ends, the positioning of the corrugated blank upon the driving roll 8, thus automatically assures its being held thereon with portions of equal length protruding beyond the end faces of the roll, and resulting in the ultimate formation of a symmetrical product.

Movement of the flange forming roll 36 towards the roll 8 is then accomplished by manipulating the proper clutch members, during which movement the marginal edges of the blank projecting beyond the driving roll are forced radially inwards to produce the inturned flanges c, the blank ultimately assuming the form shown in Fig. 3 of the drawings when the rolls 8 and 36 are moved to their final positions adjacent each other, as indicated in Fig. 5. The frictional contact of the inner periphery of the blank with the driving roll 8 during this flanging operation causes rotation of the blank about its axis, similar to that previously described in connection with the corrugating step, and the flanging operation is therefore brought about by the action of the flanges 37 and 37' upon successive points of the marginal edges circumferentially of the blank. Due to the strengthening effect produced by the previous corrugating step, the corrugated blank will maintain its circular shape during the flanging operation without special supporting means, as was necessary during initial operation upon the cylindrical blank. After the blank has been brought to its final form, the forming roll 36 is withdrawn and the finished rim removed, in an obvious fashion.

The successive corrugating and flanging steps, as just described, have been set forth in connection with the same blank for the purpose of clarity. In the practical operation of the apparatus shown, however, the corrugating and the flanging steps will be concurrently carried on in connection with separate blanks, that is, a previously corrugated blank may be subjected to the flanging operation at the same time that a plain cylindrical blank is being subjected to the corrugating step.

It is noted that in carrying out the process or method of the present invention with an apparatus such as illustrated and described, it is necessary to transfer a partially treated blank from one side of the machine to the other. This is merely incident to the particular apparatus, and does not alter the process which may be carried out without such transposition of the partially treated blank, or without the transfer of the corrugated blank to a separate and independent driving roll.

It is particularly noted that during the corrugating step the blank is held against bodily displacement in a manner to maintain a substantially true circular shape; that the portion of the blank corrugated is at its central region substantially midway between its opposite ends, leaving unworked marginal edges beyond the corrugated region; that when the corrugated blank is placed upon the flanging driving roll 8, the corrugated blank is held against axial displacement, with the previously unworked marginal edges protruding beyond the opposite end faces of the flanging driving roll; and that the flanging roll 36 is caused to simultaneously act upon both of these protruding margins to produce the inturned flanges. The simultaneous production of the inturned flanges aids in obviating any tendency of the blank to move axially of the rolls, therefore avoiding distortion of the corrugated region of the blank during the flanging operation, and assuring a substantially perfect and symmetrical product in its finished state.

I claim:

1. The method of forming a one-piece bull wheel rim which consists in providing a continuous annular metallic blank, locking said blank against axial movement while displacing the region centrally of and spaced from its edges radially to produce a corrugated surface, then subjecting a marginal edge of the partially formed rim beyond the corrugated surface to a bending force without disturbing the previously formed corrugations to displace said marginal edge radially inward to produce an inturned flange.

2. The method of forming one-piece bull wheel rims which consists in providing a continuous circular metallic blank, rotating said blank while supporting the blank against axial and bodily displacement, displacing the metal of the blank by pressure exerted progressively and radially around the blank to produce a corrugated surface, then pressing inward the metal at the opposite edges of the rim while bodily rotating the same and supporting it against axial and bodily displacement to produce inturned flanges.

3. The method of forming from sheet metal corrugated and flanged rims for bull wheels, comprising the steps of rotating a continuous cylindrical band of sheet metal between corrugated forming rolls while supporting the bands against axial and bodily displacement, gradually and progressively forming corrugations in the intermediate surface of the band by pressure exerted inside and outside thereof by the forming rolls at successive points circumferentially, then rotating the corrugated band between forming rolls while supporting it against axial and bodily displacement and gradually and progressively forcing an edge of the band inward to form a flange.

In testimony whereof, I sign my name.

CARL B. PRITCHARD.